(12) United States Patent
Bruyere

(10) Patent No.: US 9,457,683 B2
(45) Date of Patent: Oct. 4, 2016

(54) METHOD FOR DISCHARGING AT LEAST ONE CAPACITOR OF AN ELECTRIC CIRCUIT

(71) Applicant: Valeo Systemes de Controle Moteur, Cergy Saint Christophe (FR)

(72) Inventor: Antoine Bruyere, Evequemont (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 0 days.

(21) Appl. No.: 14/384,037

(22) PCT Filed: Mar. 4, 2013

(86) PCT No.: PCT/FR2013/050450
§ 371 (c)(1),
(2) Date: Sep. 9, 2014

(87) PCT Pub. No.: WO2013/132181
PCT Pub. Date: Sep. 12, 2013

(65) Prior Publication Data
US 2015/0054434 A1 Feb. 26, 2015

(30) Foreign Application Priority Data

Mar. 9, 2012 (FR) ..................................... 12 52129

(51) Int. Cl.
*H02J 7/00* (2006.01)
*B60L 11/18* (2006.01)
*B60L 3/04* (2006.01)
(Continued)

(52) U.S. Cl.
CPC .............. *B60L 11/1851* (2013.01); *B60L 3/04* (2013.01); *B60L 11/1818* (2013.01); *B60L 15/007* (2013.01); *H02J 7/0063* (2013.01); *B60L2220/54* (2013.01); *H02J 7/345* (2013.01);
(Continued)

(58) Field of Classification Search
CPC ....................................................... H02J 7/0063
USPC ................................. 318/400.3, 400.01, 700
See application file for complete search history.

(56) References Cited

U.S. PATENT DOCUMENTS

| 7,634,042 B2 * | 12/2009 | Auchterlonie | ............ H02J 4/00 315/111.41 |
| 7,999,499 B2 * | 8/2011 | Tanaka et al. | ......... B60K 6/365 318/376 |

(Continued)

FOREIGN PATENT DOCUMENTS

EP 2 407 339 A1 1/2012

OTHER PUBLICATIONS

International Search Report issued in PCT/FR2013/050450 mailed on Oct. 29, 2013 (4 pages).

*Primary Examiner* — David S Luo
(74) *Attorney, Agent, or Firm* — Osha Liang LLP

(57) ABSTRACT

The invention relates to a method for discharging at least one capacitor (2) of an electric circuit (1), said electric circuit (1) also comprising: an electric stator winding (4) of a polyphase rotary electric machine, said winding (4) comprising a plurality of coils (6) which each form a stator phase and which are not being coupled to one another; and a switching system (5) disposed between the capacitor (2) and the electric stator winding (4) and comprising a plurality of controllable switching cells (10). According to the method of the invention, the coils (6) are electrically powered by the capacitor (2) by means of the switching system (5), of which the switching cells (10) are controlled such that the homopolar electric current passes through the electric stator winding (4).

12 Claims, 1 Drawing Sheet

(51) Int. Cl.
  *B60L 15/00*   (2006.01)
  *H02J 7/34*   (2006.01)
(52) U.S. Cl.
  CPC ............. *Y02T 10/641* (2013.01); *Y02T 10/645* (2013.01); *Y02T 10/7005* (2013.01); *Y02T 10/7072* (2013.01); *Y02T 90/14* (2013.01)

(56) References Cited

U.S. PATENT DOCUMENTS

| | | | |
|---|---|---|---|
| 8,175,209 B2 * | 5/2012 | Auchterlonie | H01J 17/36 307/104 |
| 2011/0050136 A1 | 3/2011 | Sumi et al. | |

* cited by examiner

METHOD FOR DISCHARGING AT LEAST ONE CAPACITOR OF AN ELECTRIC CIRCUIT

The present invention relates to the discharge of at least one capacitor of an electric circuit comprising an electric stator winding of a rotary electric machine, and notably installed on-board a hybrid vehicle to drive the latter.

This capacitor discharge may be desirable at the end of the charging by an external electrical grid of an electrical energy storage unit of the electric circuit or at the end of a sequence during which the vehicle is driven totally or partially by the rotary electric machine. Examples in which it may be advantageous to discharge the capacitor(s) are mentioned in the standard EN 50178 from 1997:
"Electronic equipment for use in power installations".

The voltage on the terminals of this capacitor may be visible on accessible terminals of the electric circuit from the outside and the presence of this voltage may be dangerous for an operator such as a motor mechanic, for example. It is known to discharge one or more capacitors using discharge resistor(s) connected to the electric circuit and dedicated to the discharge operation. This solution increases the number of components of the electric circuit and is also expensive.

It is also known to discharge the capacitor(s) into the electric stator winding. This solution is currently relatively complex to implement since the discharge current has to be prevented from creating an unwanted motor torque.

Application US 2011/0050136 teaches how to discharge a capacitor of an electric circuit including a battery and an electric stator winding of which the coils are star-connected. During the discharge, the current from the capacitor crosses an additional branch including a resistor facilitating the discharge before passing through the electric stator winding.

A requirement exists for the simple, economical and efficient discharge of the capacitor(s) of an electric circuit including an electric stator winding of a rotary electric machine, said circuit being notably a traction circuit of a hybrid or electric vehicle.

The object of the invention is to meet this requirement and the invention achieves this using a method for discharging at least one capacitor of an electric circuit furthermore comprising:
- an electric stator winding of a polyphase rotary electric machine, said winding including a plurality of coils each forming a stator phase and not being electrically interconnected,
- a switching system including a plurality of controllable switching cells, a method in which the electric stator winding is electrically powered by the capacitor via the switching system, the switching cells being controlled in such a way that the electric stator winding is passed through by the homopolar electric current.

The above method consists in controlling the electronic switches of the switching system disposed between the capacitor(s) and the electric stator winding in such a way that the discharge current of this or these capacitor(s) is transformed by the switching system into homopolar current.

When the electric stator winding includes N coils, the homopolar current $i_{M0}$ is defined as follows:

$$i_{M0} = \frac{\sum_{j=1}^{N} i_j}{N}$$

According to the above method, the switching system control enables each coil to be passed through by a non-zero current having the value $i_{M0}$ when the capacitor(s) is/are discharged. Each coil can only be passed through by the homopolar current $i_{M0}$ during this discharge of the capacitor(s).

When the switching cells of the switching system are controlled according to the same switching period, the coils are each passed through by their own electrical current with the same mean value, over said switching period.

In the case of an electric stator winding with three phases u, v and w, each phase being respectively passed through by its own electrical current $i_u$, $i_v$ and $i_w$, the system control allows $i_u$, $i_v$ and $i_w$ all to be equal to $i_{M0}$, with the exception of the times during which a switching occurs in the switching system.

According to the above method, the electric stator winding is electrically powered by currents which each create a rotating field, and the combination of these fields does not create an overall rotating field in the air gap of the machine, in such a way that no torque is exerted on the rotor of the latter.

The rotary electric machine may be a machine configured so that the electromotive force induced in each stator phase is sinusoidal and does not comprise any 3rd-order or 3rd-order-multiple harmonics when the electric stator winding is passed through by the homopolar current. In this case, no torque is applied to the rotor. The capacitor(s) can thus be discharged, for example, in order to meet the requirements of the aforementioned EN 50178 standard without setting the rotor in motion.

Alternatively, the method can also be applied to rotary electric machines for which a low torque is applied to the rotor when the stator is powered with a homopolar current.

Each coil of the electric stator winding can have a mean voltage value on its terminals that is equal from one coil to another.

The coils are not interconnected, i.e. no coil of the electric stator winding has a terminal connected directly to a terminal of a different coil of the electric stator winding. "The coils are not electrically interconnected" is synonymous with "the coils are independent".

The stator may be three-phase, in which case the electric stator winding is formed by three coils.

The coils of the electric stator circuit may be neither star-connected nor polygon-connected, i.e. in a triangular configuration when the electric stator winding is three-phase.

The switching cells may be controlled in such a way that the mean value over the switching period of the switching cells of the sum of the currents each powering one of the coils of the electric winding is equal to a predefined non-zero value. In the three-phase case, the sum of the three currents which each pass through one of the stator coils is equal to said predefined value. In other words, the switching system control may regulate the mean value, over a switching period, of the homopolar current around a given non-zero value.

Said predefined value may be chosen according to the desired capacitor discharge percentage to be obtained from the accumulated charge (in coulombs) between the capacitor armatures before the method is carried out, also referred to below as the "initial charge". The method enables, for example, the capacitor to be discharged by at least 80% of the initial charge.

The predefined value of said mean value may also be chosen so that the discharge method has a duration less than or equal to a threshold value, in such a way as to satisfy given constraints.

In one example embodiment of the invention, the switching system includes a plurality of parallel-mounted arms, each arm including two controllable switching cells separated by a midpoint, each coil being disposed between the midpoints of two arms dedicated to said coil and the capacitor being mounted in parallel with said arms.

The circuit may comprise an electrical energy storage unit, the capacitor being mounted between the electrical energy storage unit and the switching system.

The capacitor may be connected to the electric stator winding only via the switching system, notably only via parallel-mounted arms.

During the discharge, the current from the capacitor may flow directly in the switching system and in the electric stator winding. The discharge may thus not involve this current flowing in an additional resistor. "Directly" means here "without passing through an electrical component other than electrical conductors".

The electric circuit may include a DC/DC voltage converter disposed between the electrical energy storage unit and the switching system.

The capacitor may be disposed between the electrical energy storage unit and the DC/DC voltage converter or between the switching system and the DC/DC voltage converter. Alternatively, the electric circuit may include:

a capacitor disposed between the electrical energy storage unit and the DC/DC voltage converter, and a capacitor disposed between the switching system and the DC/DC voltage converter, and, when the method is carried out, the one and/or the other of these capacitors can be discharged.

The electrical energy storage unit may be a battery, a supercapacitor or any assembly of batteries or supercapacitors. It involves, for example, a plurality of branches in parallel with series batteries. The electrical energy storage unit may have a nominal voltage between 60 V and 400 V, notably between 200 V and 400 V.

The circuit may include a connector suitable for being connected to a complementary connector of an electrical grid to charge the electrical energy storage unit, the connector including at least a plurality of contacts each having one free end and another end connected to an intermediate point of a coil. The electrical grid thus powers each coil via an intermediate point of the latter, notably the midpoint of the latter.

An electric circuit of this type may be used simultaneously for:

powering the stator coils from the electrical energy storage unit and via the switching system used as an inverter to cause the electric machine to rotate, and charging the electrical energy storage unit via the stator coils used as inductors and via the switching system used as a rectifier.

The structure of the circuit and the control of the switching cells of the switching system can allow the electrical energy storage unit to be charged without setting the rotor in motion.

The grid can deliver any one of an alternating electrical power supply quantity or a direct electrical power supply quantity. In particular, the switching cell control may be effected as described in the application filed in France on Dec. 21, 2011 under number 11 62140 by the Applicant.

An electric circuit of this type may also be connected to any type of grid, i.e. either a polyphase or monophase grid delivering an AC voltage or a grid delivering a DC voltage or a DC current.

The electric circuit is notably installed on-board an electric or hybrid vehicle, i.e. a vehicle whose traction may be effected entirely or partially using only the rotary electric machine.

The capacitor has, for example, a capacitance of between 100 µF and 5000 µF.

The rotary electric machine has, for example, a nominal power between . . . and 3 kW and 200 kW. The invention will be more readily understood from a reading of a non-limiting example embodiment of said invention and from an examination of the attached drawing, in which.

Figure 1:
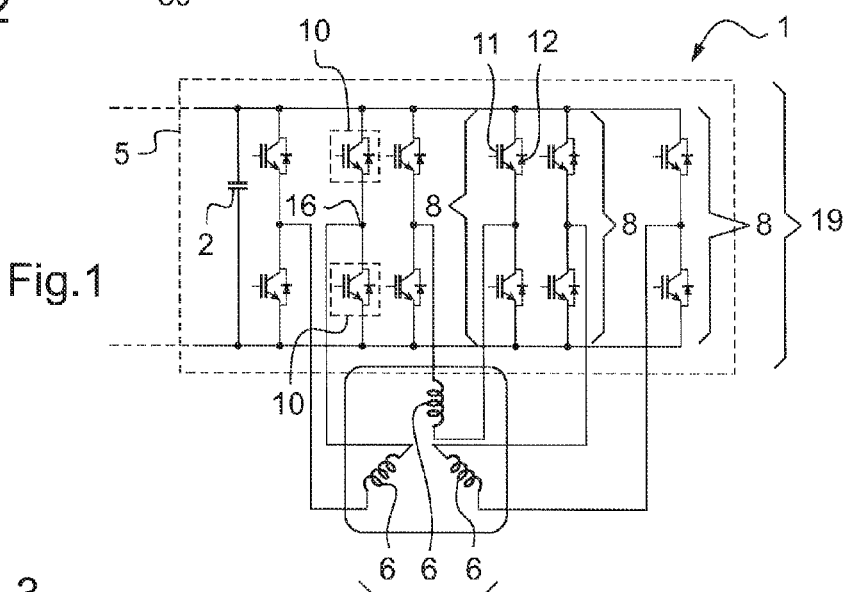
FIG. 1 shows an electric circuit including a capacitor to be discharged.

FIG. 1 shows an electric circuit 1 including a capacitor 2 which is to be discharged. The capacitor 2 has, for example, a capacitance of between 100 µF and 5000 µF. Before the method is carried out, the accumulated charge between the armatures of the capacitor 2 is, for example, between 20% and 100% of its maximum charge, such that a voltage greater than, for example, 60 V can appear on the capacitor terminals.

The electric circuit 1 furthermore includes an electric stator winding 4 and a switching system 5 disposed between the capacitor 2 and the electric stator winding 4. In the example considered, the stator is three-phase, being, for example, a synchronous motor stator, notably with a permanent-magnet rotor. Alternatively, the stator may comprise more than three phases.

In other alternatives, the stator may be a variable-reluctance machine stator or a synchronous machine stator.

The rotary electric machine may form part of a rotary electric machine configured so that the electromotive force induced in each stator phase is sinusoidal and does not comprise any 3rd-order or 3rd-order-multiple harmonics when the stator is powered with a homopolar current.

In the example considered, the electric stator winding 4 is formed by three coils 6, each defining one of the electrical phases u, v and w of the stator. In the description below, $v_u$ and $i_u$ denote respectively the voltage on the terminals of the coil defining the phase u and the current passing through the latter, $v_v$ and $i_v$ denote respectively the voltage on the terminals of the coil defining the phase v and the current passing through the latter and $v_w$ and $i_w$ denote respectively the voltage on the terminals of the coil defining the phase w and the current passing through the latter.

The homopolar voltage is defined by $u_{MO}=(u_U+u_V+u_W)/3$ and the homopolar current is defined by $i_{MO}=(i_U+i_V+i_W)/3$.

In the example shown, the switching system 5 includes a plurality of arms 8, each arm being mounted in parallel with the capacitor 2. In the example shown, each arm 8 includes two controllable switching cells 10. Each switching cell 10 is, for example, formed by a controllable switch 11, antiparallel to which a diode 12 is mounted. The switch 11 may be a transistor, notably a bipolar or IGBT field-effect transistor.

A centralized control unit 13 including digital processing means can control all of the transistors 11.

Each arm 8 includes a midpoint 16 between the two switching cells 10, and, in the example described, each midpoint 16 of an arm 8 is connected to a terminal of one of the coils 6. Each coil 6 may thus be disposed between two midpoints 16 of two separate arms, these two arms 8 then forming an H-point 19. Each H-point may be dedicated to a specific coil 6 of the electric stator winding 4.

As can be seen, the coils 6 are not interconnected. In fact, in the example shown in FIG. 1, each coil 6 has its terminals directly connected to other elements, here to switching cells 10, rather than to terminals of the other coils 6, in contrast to what would be the case if the electric stator winding 4 was connected in a star or triangular configuration.

The electric circuit 1, described with reference to FIG. 1, may be integrated into the charging and traction system of a vehicle 20, which is, for example, a hybrid or all-electric drive automobile.

Figure 2:
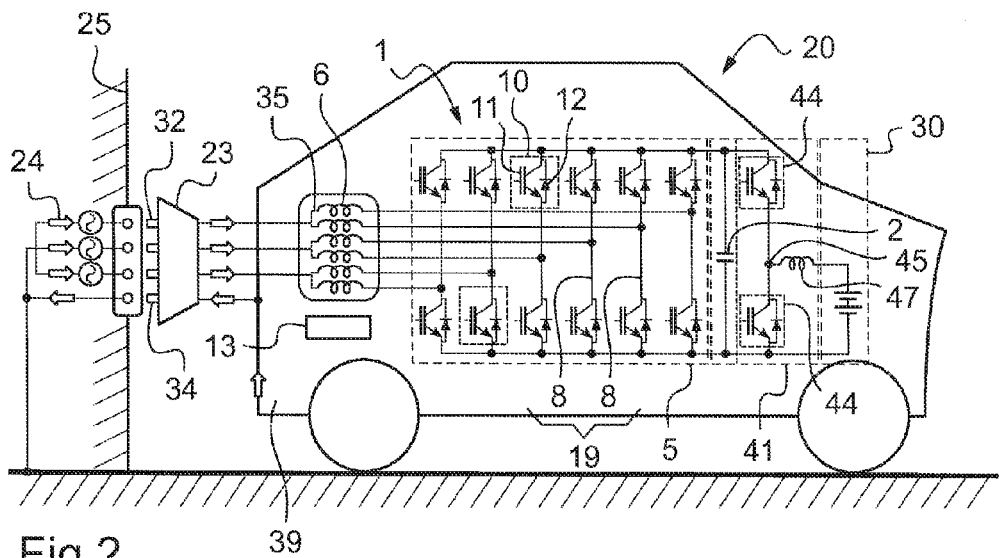
FIG. 2 shows schematically a vehicle into which the electric circuit of FIG. 1 can be integrated.

As shown in FIG. 2, the circuit 1 may then include:
- a connector 23 intended to be connected to an electrical grid 24 via a connector of an electrical energy charging means 25, and
- an electrical energy storage unit 30. The electrical energy storage unit 30 may be a battery or a parallel and/or series association of batteries.

In this example, the electrical grid 24 is a three-phase grid, but the invention applies to polyphase grids other than three-phase grids, or to monophase grids. It involves, for example an industrial grid managed by an operator and deployed on a regional, national or international scale. The grid delivers, for example, a voltage with a frequency equal to 50 Hz or 60 Hz.

In the example shown in FIG. 2, the connector 23 includes four contacts 32. Three main contacts 32 each have a free end intended to be connected to the complementary contact of the connector of the charging means 25. The fourth contact 34 of the collector 23 is connected to the bodywork 39 of the vehicle 1 and is intended to be connected to the ground of the electrical grid 24.

As can be seen, each main contact 32 can have another end connected to a coil 6. In the example shown in FIG. 2, this end is connected to a midpoint 35 of a coil 6, i.e. the link with the contact 32 separates the coil 6 into an exactly equal number of windings.

Each of the coils 6 is thus divided into two half-coils passed through by opposite currents from one half-coil to the other when current passes from the electrical grid 24 to the electrical energy storage unit 30 via the switching system 5 and the coils 6.

In the example considered, the circuit 1 also includes a DC/DC voltage converter 41. The capacitor 2 is disposed between the switching system 5 and the DC/DC converter 41 of which it forms an input. The electrical energy storage unit 30 is mounted at the output of the converter 41.

In the example shown, the converter 41 is a series chopper delivering to the electrical energy storage unit 30 an output voltage obtained through buck conversion of the input voltage on the terminals of each arm 8. In a known manner, this series chopper 41 includes two switching cells 44, identical or otherwise to the switching cells 10 of the switching system 5 and separated by a midpoint 45. The cells 44 may be controlled by the control unit 13. In the example shown, each of these cells 44 is reversible, including in antiparallel a controllable switch and a diode. An inductor 47 is disposed between this midpoint 45 and the electrical energy storage unit 30.

The control unit 13 may be configured to control the opening and closing of the switches of the switching cells 10 and 44 above in such a way that:
- the electrical energy storage unit 30 is charged by the electrical grid 24 to which the connector 23 is connected according to one operating mode, and
- the electrical energy storage unit 34 powers the coils 6 of the electrical stator winding 4 in such a way as to generate a torque driving the vehicle 20 according to a different operating mode.

In particular, the connector 23 and the control of the switching cells 10 and/or 44 may be as disclosed in the application filed in France on Dec. 21, 2011 under number 11 62140 by the Applicant and the content of which is incorporated into the present application by reference, to allow the charging of the electrical energy storage unit 30 from any type of electrical grid 24.

For example, at the end of the charging of the electrical energy storage unit 30 by the grid 24, or at the end of a sequence during which the rotary electric machine drives the vehicle 20, it may be desirable to discharge the capacitor 2 on the terminals of which an excessively high voltage is present. To do this, the switching cells 10 can be controlled in such a way that the initial charge of the capacitor 2 is dissipated in the electric stator winding 4. In the example shown in FIG. 2, the switching cells 44 are also controlled in such a way as to switch the energy storage unit 30 to an open circuit.

Figure 3:
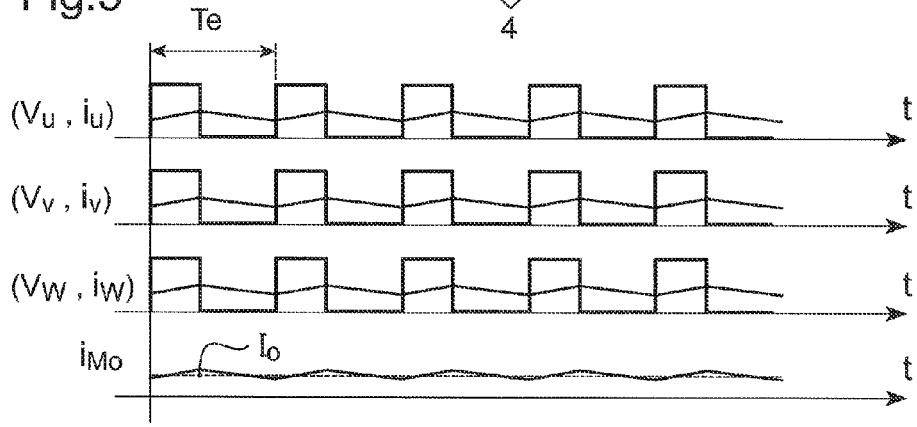
FIG. 3 shows the dedicated voltages and currents of each coil of the electric stator winding shown in FIGS. 1 and 2 when the method according the invention is carried out.

During this step, the switching cells 10 are controlled in such a way that each coil is passed through at the same time by a current of the same value, as shown in FIG. 3.

In FIG. 3, it can be seen that the electric stator winding 4 is powered by the homopolar current and that the voltage on the terminals of each coil 6 is equal.

The switching cells 10 can be controlled in such a way that the mean value of the current in each coil assumes a predefined non-zero value $I_0$, this control ensuring that no torque is applied to the rotor despite the electrical powering by the capacitor 2 of the electric stator winding 4 when the electromotive force induced in each stator phase by the discharge of the capacitor 2 is sinusoidal or does not comprise any 3rd-order or 3rd-order-multiple harmonics.

The invention can nevertheless also be applied with rotary electric machines having an electromotive force including 3rd order harmonics or multiples thereof in the case of a power supply of the stator with a homopolar current, since the motor torque generated by the homopolar current is low.

When the above method is carried out, the resistor of the electric stator winding 4 allows the dissipation of all or part of the initial charge of the capacitor 2.

For example, when the capacitor 2 has an initial charge of 0.4 C, at the time when the connector 24 is disconnected from the charging station 25 once the electrical energy storage unit 30 is charged. The method according to the invention can, for example in 5 seconds, reduce the charge of the capacitor 2 to around 50 μC or reduce the voltage on the terminals of the capacitor 2 to around 60 V.

According to another example, the above charge or voltage values can be obtained within one second from the same initial state of the capacitor 2. The invention is not limited to the examples that have just been described.

The expression "comprising a(n)" must be understood as meaning "comprising at least one", unless otherwise specified.

The invention claimed is:

1. A method for discharging at least one capacitor of an electric circuit, the electric circuit furthermore comprising:

an electric stator winding of a polyphase rotary electric machine, said winding including a plurality of coils each forming a stator phase, said coils not being electrically interconnected, a switching system including a plurality of controllable switching cells, a method in which the coils are electrically powered by the capacitor via the switching system, the switching cells of which are controlled in such a way that the electric stator winding is passed through by the homopolar electric current.

2. The method as claimed in claim 1, the coils of the electric circuit being neither star-connected nor polygon-connected.

3. The method as claimed in claim 1, the stator being three-phase.

4. The method as claimed in claim 1, the switching cells being controlled so that the mean value over the switching period of the switching cells of the sum of the currents powering one of the coils of the electric winding is equal to a predefined non-zero value.

5. The method as claimed in claim 1, the switching system including a plurality of parallel-mounted arms, each arm including two controllable switching cells separated by a midpoint, each coil being disposed between the midpoints of two arms dedicated to said coil and the capacitor being mounted in parallel with said arms.

6. The method as claimed in claim 1, the circuit furthermore comprising an electrical energy storage unit, the capacitor being mounted between the electrical energy storage unit and the switching system.

7. The method as claimed in claim 1, the circuit furthermore comprising a connector suitable for being connected to a complementary connector of an electrical grid to charge the electrical energy storage unit, the connector including at least a plurality of contacts each having one free end and another end connected to an intermediate point of a coil.

8. The method as claimed in claim 7, the electrical grid delivering any one of an alternating electrical power supply quantity or a direct electrical power supply quantity.

9. The method as claimed in claim 1, the circuit including a DC/DC voltage converter disposed between the capacitor and the electrical energy storage unit.

10. The method as claimed in claim 1, the circuit being installed on-board an electric or hybrid vehicle.

11. The method as claimed in claim 1, the capacitor being electrically connected to the electric stator winding only via the switching system.

12. The method as claimed in claim 1, during the discharge, the current from the capacitor flowing in the switching system and in the electric stator winding without passing through an electrical component other than electrical conductors.

* * * * *